United States Patent [19]

Yeo et al.

[11] Patent Number: 4,845,331
[45] Date of Patent: Jul. 4, 1989

[54] PRESSURIZED WELD CHAMBER

[75] Inventors: Denis Yeo; Robert Duncan; Kenneth K. Klapper, all of Columbia, S.C.

[73] Assignee: Westinghouse Electric Corp., Pittsburgh, Pa.

[21] Appl. No.: 137,623

[22] Filed: Dec. 24, 1987

[51] Int. Cl.⁴ .............................................. B23K 9/16
[52] U.S. Cl. ........................................ 219/72; 219/74
[58] Field of Search ...................... 219/72, 74, 125.1

[56] References Cited

U.S. PATENT DOCUMENTS

| | | | |
|---|---|---|---|
| 3,413,436 | 11/1968 | Tallman . | |
| 3,522,406 | 8/1970 | Sipos et al. . | |
| 3,693,148 | 8/1972 | Boyko et al. . | |
| 3,767,890 | 10/1973 | Madden, Jr. | 219/74 |
| 3,798,409 | 3/1974 | Troyer et al. . | |
| 3,842,238 | 10/1974 | Boyko et al. | 219/74 |
| 3,909,586 | 9/1975 | Landis et al. . | |
| 4,003,788 | 1/1977 | Boyko et al. . | |
| 4,016,398 | 4/1977 | Herrick . | |
| 4,057,705 | 11/1977 | Cockrum et al. . | |
| 4,075,454 | 2/1978 | Duncan et al. . | |
| 4,090,057 | 5/1978 | Okada . | |
| 4,101,751 | 7/1978 | Urbanic et al. . | |
| 4,136,273 | 1/1979 | Eujita et al. . | |
| 4,553,014 | 11/1985 | Culbreth . | |
| 4,587,094 | 5/1986 | Bucher . | |

FOREIGN PATENT DOCUMENTS 130005 3/1977 Fed. Rep. of Germany .
1409533 9/1964 France .
653054 6/1976 U.S.S.R. .

OTHER PUBLICATIONS

Pilia, "Spot Welding With Inert Gas," The Welding Engineer, Jan. 1949, pp. 56–58, 60.
Huff, Jr. et al., "Practical Aspects of Inert-Gas Welding," The Welding Journal, Feb. 1949, pp. 128–140.

Primary Examiner—E. A. Goldberg
Assistant Examiner—Lincoln Donovan

[57] ABSTRACT

A novel weld chamber and process for using such weld chamber are disclosed. A flow of shielding gas through the weld chamber is regulated to provide a constant pressure in the weld chamber while the shielding gas flow sweeps away metal vapors.

12 Claims, 1 Drawing Sheet

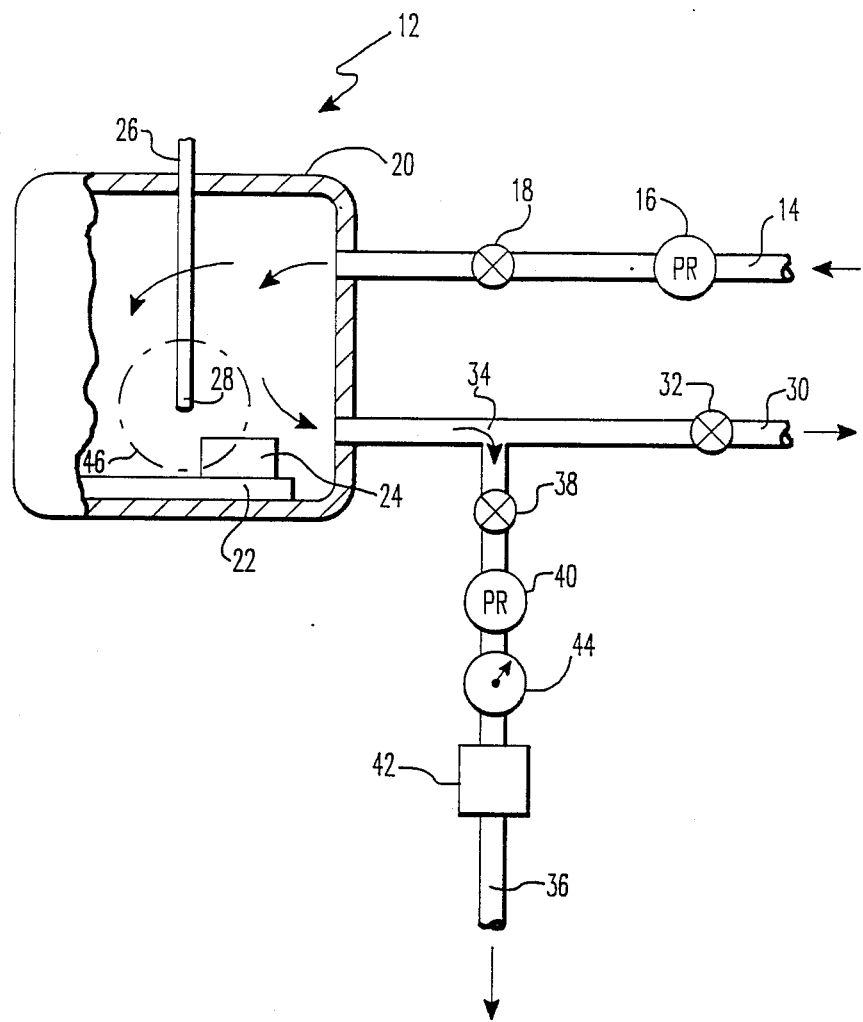

PRESSURIZED WELD CHAMBER

BACKGROUND OF THE INVENTION

Pressurized welding processes, and pressurized tungsten inert gas (TIG) welding processes in particular, are conducted in a sealed pressure chamber. Flooding the weld chamber with a shielding gas creates pressure in the weld chamber. After the desired pressure is achieved the weld chamber is sealed. There is thus no flow of shielding gas through the weld chamber to sweep metal vapors formed in the welding zone away from the electrode tips. In this environment, blobs of metal form on the electrode tips, causing them to become unusable. Typically, electrodes must be replaced after about five to ten welds. Metal buildup or blob formation at the electrode tip causes welds of unacceptable quality. Furthermore, metal buildup often falls from the electrode tip into the weld puddle, thus contaminating the weld and making the object being welded unacceptable. A further problem with such pressurized welding processes is the rapid buildup of metal oxide in the pressure chamber which necessitates frequent cleaning of the weld chamber.

SUMMARY OF THE INVENTION

The invention comprises a weld chamber for receiving a shielding gas, wherein a workpiece is welded under a controlled atmosphere resulting from the introduction of the shielding gas and wherein metal vapors are produced. The weld chamber comprises a pressure chamber for containing the controlled atmosphere, a gas inlet for delivering the shielding gas to the pressure chamber, a gas outlet for removing the shielding gas and metal vapors from the pressure chamber, and an outlet port in the gas outlet which draws the shielding gas and metal vapors from the gas outlet and thus permits a regulated flow of shielding gas through the weld chamber during a welding operation. The flow of shielding gas causes metal vapors to be swept away from a zone surrounding an electrode tip and the weld location, thereby reducing the buildup of metal at the electrode tip. Decreased metal buildup at the electrode tip substantially increases the useful life of the electrode, and substantially decreases the probability of a contaminated weld.

In the method according to the present invention, constant pressure and temperature within the weld chamber are maintained while providing a flow of shielding gas through the chamber to sweep contaminating metal vapors from the weld zone.

BRIEF DESCRIPTION OF THE DRAWINGS

The drawing is a schematic diagram of a pressurized weld chamber according to the present invention.

DETAILED DESCRIPTION OF THE INVENTION

The drawing shows an exemplary embodiment of a weld chamber 12 in accordance with the invention. A gas inlet 14 is equipped with a pressure regulator 16 and a valve 18. The gas inlet 14 opens into pressure chamber 20 in which is located grounded support 22, on which work piece 24 is placed for performance of a welding operation. An electrode 26 is disposed such that its tip 28 is located within pressure chamber 20 in sufficiently close proximity to the work piece 24 to permit the welding operation. Also opening into pressure chamber 20 is gas outlet 30 which is equipped with a normally closed valve 32. Outlet port 36 intersects gas outlet 30 at T-juncture 34. Outlet port 36 is equipped with a series connected valve 38, pressure regulator 40, flow meter 42 and needle valve 44. The outlet port 36 permits a purging or flow of the shielding gas and metal vapors from pressure chamber 20 when valve 38 is open. The purge results in a flow of shielding gas from gas inlet 14 through pressure chamber 20, then out through outlet port 36. The typical gas flow path is illustrated by the arrows of the drawing.

Pressure regulators 16 and 40 control the flow of the shielding gas and permit the control of the internal pressure of pressure chamber 20. Flow meter 42 and needle valve 44 are used to monitor and control the gas flow such that a constant internal pressure is maintained. During welding, metal vapors form in and about a welding zone 46. As the shielding gas flows through pressure chamber 20, it sweeps away metal vapors created by the welding operation from the welding zone 46. The concentration of metal contaminants in the weld chamber 12 is substantially decreased by the flow of shielding gas therethrough. This gas flow not only sweeps away contaminating metal vapors, but also provides a clean, fresh atmosphere in which to perform the welding operation.

A further advantage offered by the flow of shielding gas through the weld chamber 12 is that it acts to chill welding zone 46. In conventional processes performed with conventional apparatus, the heat of the welding operation causes a pressure buildup in the weld chamber 12. Freshly supplied, relatively cool shielding gas nullifies any pressure buildup by preventing a heat buildup in welding zone 46.

Sweeping of the metal vapors by the gas flow decreases metal buildup at electrode tip 28, thereby allowing the electrode 26 to be used for more welds before being replaced. Electrodes used in conventional pressurized welding apparatus and processes usually must be changed after every five to ten welds. In contrast, electrodes used in the present invention typically last for more than 100 welds before requiring replacement.

The sweeping of the metal vapors from the pressure chamber also allows the pressure chamber to be used for more welds before cleaning is required. Metal oxides deposit on the interior walls of conventional pressurized weld chambers. In the present invention, the metal vapors are swept out of the chamber 20 before such metal oxide formation and buildup occurs. Therefore, it is necessary to clean the apparatus less frequently.

Before using the weld chamber 12 of the present invention, the system is first purged with a shielding gas. After the purge, valves 18 and 38 are normally opened and valve 32 is normally closed. Pressure regulators 16 and 40 are then adjusted such that the desired pressure is established in pressure chamber 20. The flow of gas to achieve the desired pressure is monitored on flow meter 42 and any necessary adjustment is made with needle valve 44. Once the desired internal pressure has been achieved, the welding operation may begin.

The internal pressure within the weld chamber 12 may be maintained at any desired level for the welding operation to be performed. Typically, the pressure chamber 20 is maintained at a pressure between about 0 psig and about 1,000 psig, but more commonly the internal pressure ranges from about 100 psig to about 700 psig.

The internal atmosphere of the weld chamber 12 is a controlled atmosphere, as is conventional in the art. The controlled atmosphere is composed of the shielding gas used to flood the weld chamber 12. Controlled atmospheres are used to enhance the welding operation by decreasing the amount of metal oxides produced during the welding operation and to prevent oxidation of the workpiece 24.

Any type of welding under pressure may be performed using the apparatus and process of the invention. Typically, seal welding of nuclear fuel rods is performed under pressure, and may be performed in the apparatus of the invention. Circumferential girth welding is a further welding operation which may be performed using the invention.

The most common type of welding operation performed with the welding chamber 12 of the invention is tungsten inert gas (TIG) welding, which is also sometimes referred to as gas tungsten arc welding. This type of welding makes use of direct current. Metal inert gas (MIG) welding, in which the electrode comprises the filler material, may also be performed using the chamber of the invention. Examples of pressurized welding techniques which can be used with the present invention are disclosed in U.S. Pat. Nos. 4,003,788 and 4,075,454, which are incorporated herein by reference. The shielding gases which can be used to pressurize the weld chamber are those conventional in the art, and include helium, argon, helium-argon mixtures, and helium-xenon mixtures. Additionally, some shielding gases contain small amounts of oxygen, and examples of such shielding gases include helium-oxygen mixtures and argon-oxygen mixtures.

It will be apparent that many modifications and variations of the invention are possible, in light of the above teachings. It is therefore understood that within the scope of the appended claims, the invention may be practiced other than as specifically described.

What is claimed is:

1. A weld chamber for receiving therein a shielding gas, said weld chamber for welding a workpiece in a welding zone maintained under a controlled atmosphere resulting from the introduction of the shielding gas and in which metal vapors are produced in said welding zone during a welding operation and said metal vapors are swept from the welding zone by a continuous flow of shielding gas, comprising:
   (a) a pressure chamber for containing the controlled atmosphere;
   (b) a gas inlet for delivering the shielding gas to the pressure chamber;
   (c) a gas outlet for removing the shielding gas and metal vapors from the pressure chamber; and
   (d) an outlet port in the gas outlet, said outlet port for drawing the shielding gas and metal vapors from the gas outlet in a controlled manner, thereby permitting a regulated continuous flow of the shielding gas through the weld chamber to sweep the metal vapors from the welding zone during the welding operation.

2. The weld chamber of claim 1 including means for regulating the pressure of delivery of the shielding gas to the pressure chamber and removal therefrom to maintain a constant pressure therein.

3. The weld chamber of claim 2 wherein the constant pressure is a pressure between about 0 psig and about 1,000 psig.

4. The weld chamber of claim 3 wherein the pressure is between about 0 psig and about 700 psig.

5. The weld chamber of claim 1 wherein the outlet port includes a pressure regulator for regulating shielding gas pressure and a flow meter and needle valve therein for controlling the flow of shielding gas and metal vapors therethrough.

6. The weld chamber of claim 5 wherein the gas inlet includes an inlet pressure regulator for regulating gas pressure into said pressure chamber.

7. The weld chamber of claim 1 wherein the workpiece comprises a fuel rod and a sealing weld is performed thereon.

8. The weld chamber of claim 1 wherein the workpiece comprises a fuel rod and a circumferential girth weld is performed thereon.

9. The weld chamber of claim 1 further comprising an electrode to perform the welding operation.

10. The weld chamber of claim 1 wherein the shielding gas is introduced at a relatively low temperature for cooling a weld zone.

11. A weld chamber for receiving a shielding gas, said weld chamber for welding a workpiece under a controlled atmosphere resulting from the introduction of the shielding gas and in which metal vapors are produced in a welding zone during a welding operation and said metal vapors are swept from the welding zone by a continuous flow of shielding gas, comprising:
   (a) a pressure chamber for containing the controlled atmosphere;
   (b) a gas inlet for delivering the shielding gas to said pressure chamber and into the welding zone;
   (c) a gas outlet for removing the shielding gas and metal vapors produced in the welding zone from the pressure chamber;
   (d) an outlet port in the gas outlet, said outlet port for drawing the shielding gas and metal vapors from the gas outlet in a controlled manner, thereby permitting a regulated continuous flow of the shielding gas through the weld chamber to sweep the metal vapors from the welding zone during the welding operation;
   (e) a valve in the gas inlet to permit delivery of the shielding gas to the weld chamber;
   (f) a valve in the gas outlet to block escape of the shielding gas from the weld chamber;
   (g) a valve in the outlet port to permit exit of the shielding gas and metal vapors from the weld chamber;
   (h) a pressure regulator in the gas inlet and a pressure regulator in the outlet port to maintain internal pressure of the weld chamber; and
   (i) a flow meter with a needle valve in the outlet port to monitor and control the flow of shielding gas and metal vapors from the weld chamber.

12. A process for welding a workpiece under a controlled atmosphere within a weld chamber receiving a flow of a shielding gas therein and in which weld contaminating metal vapors are produced in a welding zone during welding and said metal vapors are swept from the welding zone by a continuous flow of shield gas, comprising the steps of regulating the flow of shielding gas into the weld chamber and regulating the flow of weld contaminating metal vapors and shielding gas from the weld chamber for continuously sweeping the welding zone of stray contaminating metal vapors produced during welding and maintaining the weld chamber at a constant internal pressure and temperature.

* * * * *